United States Patent [19]

Shafer

[11] 3,998,940
[45] Dec. 21, 1976

[54] PROCESS FOR THE PRODUCTION OF LIGHT STABLE ANTIMONOUS OXIDE BY HYDROLYSIS OF ANTIMONY TRICHLORIDE IN THE PRESENCE OF COMPLEXING AGENTS

[75] Inventor: John L. Shafer, Pomona, Calif.
[73] Assignee: Occidental Petroleum Corporation, Los Angeles, Calif.
[22] Filed: Mar. 2, 1973
[21] Appl. No.: 337,306

[52] U.S. Cl. .............................. 423/617; 106/303
[51] Int. Cl.² .................. C01B 27/00; C01B 29/00; C01G 29/00
[58] Field of Search ............. 423/87, 617; 106/303

[56] References Cited
UNITED STATES PATENTS
3,676,362 7/1972 Yates .................................. 423/87

OTHER PUBLICATIONS
Chimia—Water Soluble Antimony (III) complexes—1967—pp. 541–544.

Primary Examiner—Oscar R. Vertiz
Assistant Examiner—Eugene T. Wheelock
Attorney, Agent, or Firm—Christie, Parker & Hale

[57] ABSTRACT

Antimony trichloride or a solution thereof is added to a basic solution containing a complexing agent, preferably ethylenediaminetetraacetic acid, in which the antimony trichloride is present in an amount up to 5 moles per mole of complexing agent to hydrolyze antimony trichloride to light stable senarmontite.

34 Claims, 1 Drawing Figure

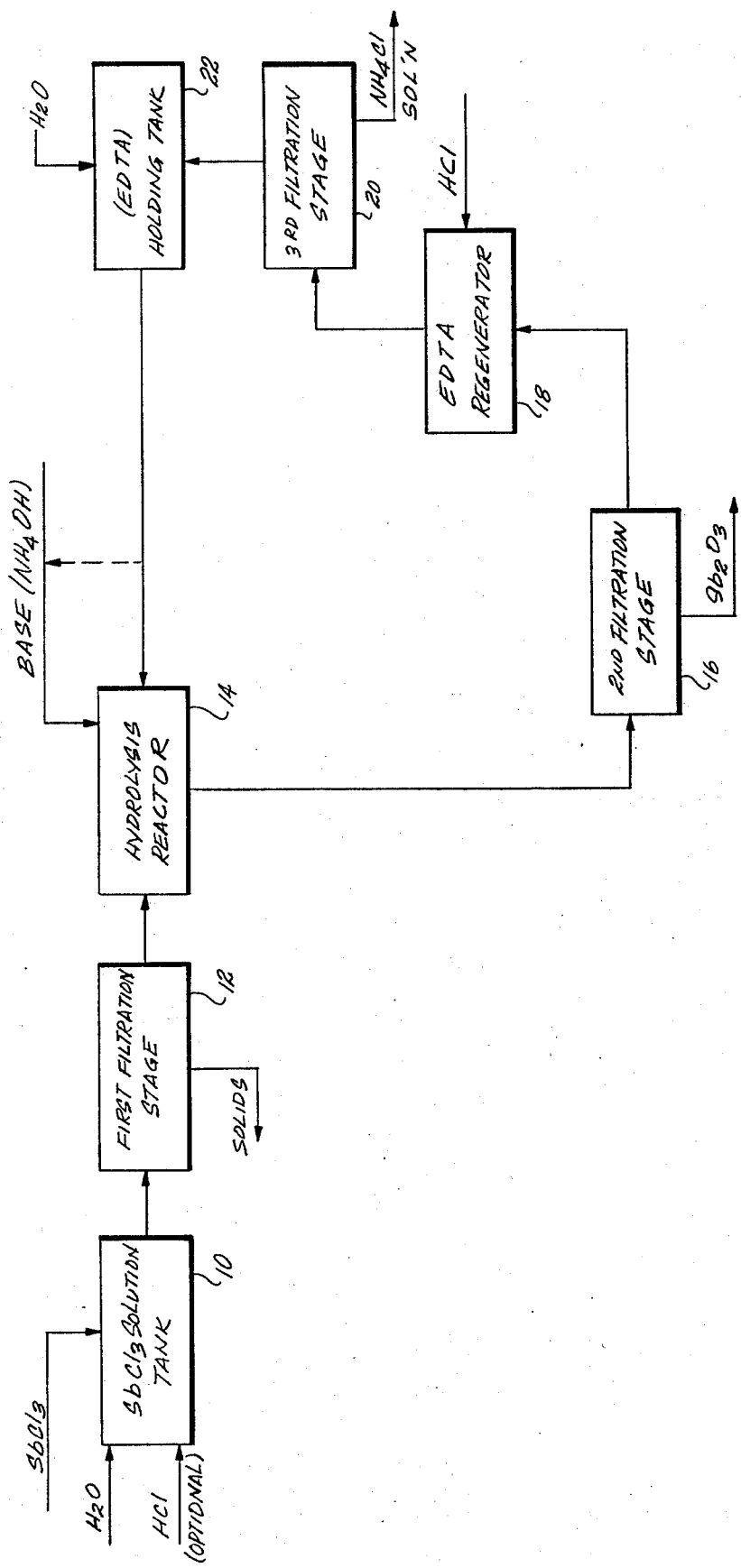

PROCESS FOR THE PRODUCTION OF LIGHT STABLE ANTIMONOUS OXIDE BY HYDROLYSIS OF ANTIMONY TRICHLORIDE IN THE PRESENCE OF COMPLEXING AGENTS

BACKGROUND OF THE INVENTION

Light stable forms of antimonous oxide are used in the manufacture of paints, plastics and ceramic ware, because of the extreme whiteness of the material and its stability against darkening in the presence of light.

Antimonous oxide exists in two crystal states, one is cubic (senarmontite) and the other orthorhombic (valentinite).

While naturally occurring valentinite is light insensitive, valentinite formed by the hydrolysis of solid antimony trichloride in the presence of aqueous ammonia at elevated temperature heretofore results in a product which is light-sensitive and will darken upon exposure to light.

Light sensitivity of synthetically produced valentinite has been attributed to absorbed water and the product has been converted to a light insensitive material when heated under vacuum to a temperature of at least 250° C.

SUMMARY OF THE INVENTION

According to the present invention, there is formed the light stable form of antimonous oxide, namely, cubic senarmontite by direct hydrolysis of an aqueous solution of antimony trichloride in a basic solution containing a complexing agent in which the mole ratio of antimony trichloride to the complexing agent is up to about five. The ratio is influenced by the complexing agent affinity for the antimony species present between solution of antimony trichloride and the antimonous oxide formed therefrom.

The process, in general, comprises first forming a solution of antimony trichloride, if solid or molten antimony trichloride is not used directly. The antimony trichloride solution may be formed by the addition of solid or molten antimony trichloride to water. If difficulty is encountered in dissolving or keeping the antimony trichloride dissolved, hydrochloric acid, or a chloride salt such as alkali metal, alkaline earth metal and/or ammonium chloride may be added.

The resultant solution or molten antimony trichloride is then normally filtered, if solids are present, and added to a basic solution, preferably one containing ammonia and containing a complexing agent.

By antimony complexing agent, there is meant a compound capable of coupling with both cationic antimony (III) and the intermediate species, except antimony oxide and antimony hydroxide, which are the result of partial hydrolysis, such as to have sufficient effect on the chemistry, and which can be displaced by hydroxide to form antimonous oxide thereof.

Antimonous complexing agents include compounds containing carboxyl groups such as ethylenediaminetetraacetic acid, nitrilotriacetic acid, tartaric acid, polyols such as mannitol or pyrocatechol, organic nitro and the like compounds such as nitrated sugars and organic sulfate compounds, such sulfonated sugars. Ethylenediaminetetraacetic acid is preferred because it is amenable to regeneration for reuse in the process.

Control is taken such that antimony trichloride is present in an amount up to 5 moles per mole of complexing agent with the mole ratio of antimony trichloride to complexing agent decreasing with an increase in the ratio of the antimony trichloride to hydrolysis solution.

Reaction may be carried out at any temperature from the solution freezing point to about 100° C, more preferably, from about 0° to 90° C.

There is formed as the product of the hydrolysis reaction, cubic senarmontite which is the light stable form of antimonous oxide. The product is usually of fine particle size having an average particle size of about 1 micron which makes it directly useful as a light stable additive for paints, plastics and ceramic ware.

When ethylenediaminetetraacetic acid is employed as the complexing agent, it may be readily regenerated by reaction with a mineral acid such as hydrochloric acid and converted to its neutral form for recycle to the hydrolysis reaction zone.

THE DRAWING

The attached Drawing is a schematic illustration of one method of carrying out the process of this invention.

DESCRIPTION

According to the present invention, there is provided a process for the production of light stable cubic antimonous oxide from antimony trichloride.

The process comprises, in general, adding solid or molten antimony trichloride or, preferably, an aqueous solution of antimony trichloride in water alone or in the presence of a chloride as provided by the addition of hydrochloric acid and/or an alkali metal chloride, alkaline earth metal chloride, ammonium chloride, as well as mixtures thereof, to a basic solution, preferably an ammonium hydroxide solution, which contains a complexing agent for dissolved antimony and the intermediate antimony species present during hydrolysis, the complexing agent being present to provide a mole ratio of antimony trichloride to complexing agent of about 5 or less, to hydrolyze the antimony trichloride to the light stable form of antimonous oxide, namely, senarmontite, which forms a precipitate of fine particle size.

Also included within the scope of this invention is the addition of antimony trichloride in a partially hydrolyzed state, either as a solid, a melt, or as a solution.

A unique feature of the process is that the amount of complexing agent present is substantially less than that required to complex with all of the antimony introduced as antimony trichloride. Yet there is not formed the light sensitive form of antimonous oxide, namely, valentinite, which is formed in the absence of a complexing agent.

With these general parameters, the following is a more detailed description of one method of carrying out the process of this invention.

With reference now to the Drawing, if a solution of antimony trichloride is not readily available for feed for the hydrolysis reactor, it is formed in antimony solution tank 10 where antimony trichloride is dissolved in water alone or in water to which hydrochloric acid and/or an alkali metal chloride, an alkaline earth metal chloride, or ammonium chloride has been added.

Generally, the amount of antimony trichloride present for optimum processing is from about 6 parts by weight to about 9.0 parts by weight antimony trichloride, preferably 8.5 to 9.0 parts by weight per part by weight water.

As indicated, if difficulty is encountered in keeping the antimony trichloride solubilized, hydrochloric acid, or a suitable chloride salt, is added to keep the antimony trichloride in solution. In any event, requirement for addition of hydrochloric acid or a suitable chloride salt becomes greater as the antimony trichloride to water weight ratio decreases.

Independent of the manner in which the solution is formed, the solution from the antimony trichloride solution tank 10 is then passed to a first filtration stage 12 to remove any solids which may be present. Sulfur, for instance, is a possible impurity in an antimony trichloride feed to solution tank 10. Sulfur, along with many other impurities, which are soluble in antimony trichloride lose their solubility in the presence of water and are removed in first filtration stage 12.

The filtered solution is then added to hydrolysis reactor 14 which already contains a solution of at least the complexing agent. Preferably, a base, normally ammonium hydroxide, is also present. The amount of base, whether present or added, should be sufficient to maintain the hydrolysis reaction zone at a pH between about 7 and about 10.

The complexing agents which may be used include, among others, ethylenetetraminediacetic acid (EDTA), as well as complexing agents having carboxyl groups such as nitrilotriacetic acid, tartaric acid, and polyols such as mannitol and pyrocatechol, and the like, as well as mixtures thereof. Ethylenediaminetetraacetic acid is preferred as it is readily regeneratable. It may be added initially as a disodium salt or other forms, such as its hydrogen form prepared when EDTA is continuously recycled in the process.

While the complexing agent must be present in the hydrolysis reactor, prior to the addition of the antimony trichloride solution, in order to complex with antimony trichloride, ammonia or other base used, may be added following the addition of the antimony trichloride solution to the hydrolysis reactor.

For optimum operation, the concentration of antimony trichloride in the hydrolysis reactor is maintained at a fairly low level, generally in the order of about 1.5 to about 2.0 percent by weight. At this concentration, the mole ratio of antimony trichloride to ethylenediaminetetraacetic acid, or other complexing agent, need only be from about 4.2 to 5.0, preferably from about 4.2 to about 4.6, as at this mole ratio, the light stable form of antimonous oxide will be produced as opposed to valentinite. A mole ratio of antimony trichloride to ethylenediaminetretraacetic acid less than 4.2 will also produce light stable antimonous oxide, but at the expense of increased acid consumption in the regeneration stage.

If the mole ratio goes much above 5.0, at the aforementioned antimony trichloride concentration, the product will tend to become light unstable.

At higher or lower antimony trichloride concentrations, more complexing agent is required for the antimony and the mole ratio of antimony trichloride to complexing agent will generally decrease.

Since complexing agents which are not regenerative add materially to the cost of the process, it is, for reasons set forth above, preferable to operate at low antimony trichloride concentrations to minimize operating costs.

It is evident from the above that the amount of complexing agents present is, generally, insufficient to complex with all of the antimony present and yet valentinite is not formed.

While not being bound by theory, it may be that the complexing agent ties up the antimony and the intermediate species undergoing hydrolysis such as $[SB^{+III}(H_2O)_x (Cl)_y (OH)_z]^{3-y-z}$ to prevent formation of valentinite and as antimonous oxide is formed, the complexing agent is released to couple with additional antimony, whereas in the absence of a complexing agent, antimony hydrolyzes to form the light unstable form of antimonous oxide, namely, valentinite.

Hydrolysis may be carried out over a broad range of temperatures, preferably from about 0° to 100° C. Reaction times generally range up to about one-half hour for the complete hydrolysis of antimony trichloride to antimonous oxide.

There is formed as a consequence of the hydrolysis reaction the light stable form of antimonous oxide, cubic senarmontite, which precipitates out as a fine powder, normally have an average particle size of about 1 micron which makes it directly useful as a light stable pigment or filler.

As antimonous oxide is formed, it is withdrawn, usually as a slurry, with some of the reactor solution and passed through second filtration stage 16 where the light stable antimonous oxide is removed as a product and dried.

Where ethylenediaminetetraacetic acid is employed as the complexing agent or where one of the alternative complexing agents is regeneratable, it is sent to regeneration zone 18 depicted in the Drawing as EDTA regenerator.

In the instance where ethylenediaminetetraacetic acid is used, upon formation of the antimonous oxide, the filtrate from the second filtration stage 16 contains a mixture of tri- and tetra- basic ethylenediaminetetraacetic acid along with any excess base (ammonia) and its neutralized salt (ammonium chloride).

To regenerate ethylenediaminetetraacetic acid, there is added in regenerator 18 a mineral acid such as hydrochloric acid which forms a solution of ammonium chloride or the chloride of the cation of the base used in hydrolysis reactor. Simultaneously, ethylenediaminetetraacetic acid salt is converted to its neutral form as a crystallate. The solution containing the neutral form of ethylenediaminetetraacetic is sent to a third filtration stage 20 where the solution is separated and the neutral form of ethylenediaminetetraacetic acid is sent to holding tank 22 for dissolution by water addition and subsequently fed to hydrolysis reactor 14, alone or in admixture with the base fed to the hydrolysis reactor.

The solution from third stage filtration may be discarded to waste or processed for values contained therein.

EXAMPLE 1

A solution was prepared which was 2.19 molar in antimony trichloride ($SbCl_3$) and 3.42 molar in hydrogen chloride (HCl) by the addition of solid antimony trichloride to a 37% solution of hydrochloric acid in water. The resultant solution was filtered to remove any solids present. The solution was then added with agitation to a basic solution which was 0.4 molar with respect to $NH_3$, the total amount of $NH_3$ present being 30% in excess of that required to neturalize HCl and hydrolyze antimony trichloride.

The final concentration of antimony trichloride in the hydrolysis reactor was 1.54 percent by weight. Also present was the disodium salt of ethylenediaminetetraacetic acid in an amount equivalent to 1.00 mole per 4.24 moles of antimony trichloride. The solution of ammonia and disodium salt of ethylenediaminetetraacetic acid had been cooled to 0° C before addition of the antimony trichloride solution. After agitation for 3 hours, the temperature of the mixture increased to 17° C. There was formed a white precipitate of antimonous oxide ($Sb_2O_3$) which was in a finely divided state. The precipitate was filtered and dried at 110° C and there was formed a yield which was in excess of 99% based on the amount of antimony trichloride present and having an average particle size of about 1 $\mu$. The filtrate whose pH was 8.7 was acidified with concentrated hydrochloric acid to a pH of about 1.6 and allowed to stand. After several hours standing there was formed crystalline [(HOOC—$CH_2$)$_2$N—$C_2$—COOH)$_2$] which was filtered and dried at 110° C for reuse. Analysis by photosensitivity and x-ray powder patterns on the dried antimonous oxide revealed it to be the light stable form senarmontite.

EXAMPLE 2

This example was performed under the same conditions as in Example 1 except that the hydrolysis was done at ambient temperature, instead of 0° C. As in Example 1, the white antimonous oxide product was light stable.

EXAMPLE 3

An antimony trichloride solution was prepared by adding together 8.70 parts by weight of antimony trichloride and 1.00 part by weight of water to form a liquid at ambient temperature. This solution was then added with agitation to a basic solution which was 0.26 molar with respect to ammonia. The total amount of ammonia being 4% in excess of that required to hydrolyze the antimony trichloride and the concentration of antimony trichloride in the hydrolysis reactor was 1.8% by weight. Also present with the ammonia was the disodium salt of ethylenediaminetetraacetic acid in an amount equivalent to 1 mole per 4.90 moles of antimony trichloride. The hydrolyzed antimony trichloride slurry was agitated at ambient temperature for 1½ hours, and slurry had a final pH of 7.8. The white precipitate was filtered, rinsed, and dried at 110° C and there was formed a light stable senarmontite with a yield which was in excess of 99% based on the amount of antimony trichloride present.

EXAMPLE 4

This example was performed under the same conditions as in Example 3 except that the temperature during the hydrolysis was maintained between 0–3° C. As in Example 3, the antimonous oxide product was light stable.

EXAMPLE 5

This example was performed under the same conditions as in Example 3 except that the temperature during the hydrolysis was maintained above 80° C. As in Example 3, the antimonous oxide product was light stable.

EXAMPLE 6

An antimony trichloride solution, same as the one described in Example 3, was added with agitation to an aqueous solution of the disodium salt of ethylenediaminetetraacetic acid, such that the molar ratio of antimony trichloride to ethylenediaminetetraacetic acid was 4.25:1, and the final concentration of antimony trichloride was 1.5% by weight. This acid slurry was then made basic to a pH of 8.0 by the addition of concentrated ammonium hydroxide. The hydrolyzed antimony trichloride slurry was agitated at ambient temperatures for one hour, and then the white precipitate was filtered, rinsed, and dried at 110° C. The product, a light stable antimonous oxide, was formed with a yield in excess of 99%.

EXAMPLE 7

In this example, flakes of pure antimony trichloride, instead of a solution, were added with agitation to a solution of the disodium salt of ethylenediaminetetraacetic acid and ammonia. The mole ratio of the antimony trichloride to the ethylenediaminetetraacetic acid was 5.0:1.0 and the concentration of the antimony trichloride was 1.5% by weight. The hydrolyzed antimony trichloride slurry was agitated for 3 hours and the temperature was held to about 80° C and the pH maintained at a level of 8.0. The white precipitate of antimonious oxide was filtered, rinsed, and dried at 110° C and the yield was in excess of 99%. The antimonous oxide so formed was light stable.

EXAMPLE 8

An antimony trichloride solution with an 8.87:1 weight ratio of antimony trichloride to water was added with agitation at ambient temperature to a solution of nitrilotriaacetic acid and ammonia. The mole ratio of antimony trichloride to nitrilotriaacetic was 4.2:1 and the concentration of antimony trichloride was 1.5% by weight. The hydrolyzed antimony trichloride slurry was agitated for 1½ hours at ambient temperature after which the pH was 8.2. The white precipitate of antinonious oxide was filtered, rinsed, and dried at 100° C and yield was in excess of 99%. This antimonous oxide was light stable.

EXAMPLE 9

This example was performed under the same conditions as in Example 8 except that the complexing agent at the same mole ratio of 4.2:1 was mannitol instead of nitrilotriaacetic acid. As in Example 8, the so formed white antimonous oxide product was light stable.

EXAMPLE 10

This example was performed under the same conditions as in Example 8 except that the complexing agent at the same mole ratio of 4.2:1 was tartaric acid instead of nitrilotriaacetic acid. As in Example 8, the so formed white antimonous oxide product was light stable.

What is claimed is:
1. A process for the production of the senarmontite from antimony trichloride which comprises:
  a. adding antimony trichloride to a hydrolysis reaction zone containing an aqueous solution of at least one organic antimony complexing agent present to prevent the formation of valentinite and which is capable of coupling with $Sb^{+++}$ and intermediate antimony hydrolysis species but incapable of coupling with antimonous oxide and antimony hydroxide, the mole ratio of antimony trichloride to total antimony complexing agent dissolves in solution being less than about five;
  b. reacting the antimony trichloride in the presence of said antimony complexing agent and a base to hydrolyze the antimony trichloride to cubic antimonous oxide as senarmontite at an aqueous solution temperature from the freezing point of the aqueous solution to about 100° C and at a pH from about 7 to about 10;

c. separating the cubic antimonous oxide from the hydrolysis reaction zone.

2. The process of claim 1 in which the base is present in the aqueous solution prior to the addition of the antimony trichloride to the hydrolysis reaction zone.

3. The process of claim 2 in which the base is ammonium hydroxide.

4. The process of claim 1 in which the antimony trichloride is added to the hydrolysis reaction zone as an aqueous solution of antimony trichloride in water.

5. The process of claim 1 in which the antimony trichloride is added to the hydrolysis reaction zone as an aqueous chloride solution of antimony trichloride water and a chloride selected from the group consisting of hydrochloric acid, alkali metal chlorides, alkaline earth metal chlorides, ammonium chloride and mixtures thereof.

6. The process of claim 2 in which the antimony trichloride concentration in the hydrolysis reaction zone is from about 1.5 to about 2.0 percent by weight.

7. The process of claim 6 in which the mole ratio of antimony trichloride to antimony complexing agent is from about 4.2 to 5.0.

8. The process of claim 6 in which the mole ratio of antimony trichloride to antimony complexing agent is from about 4.2 to about 4.6.

9. A process for the production of senarmontite from antimony trichloride which comprises:

a. adding antimony trichloride to hydrolysis reaction zone containing a solution of water and at least one organic antimony complexing agent present to prevent the formation of valentinite and capable of at least coupling with $Sb^{+++}$ and intermediate antimony hydrolysis species but incapable of coupling with antimonous oxide and antimony hydroxide and present in the solution in an amount of from about 1.5 to about 2.0 percent by weight, the mole ratio of antimony trichloride to total antimony complexing agent dissolved in solution being less than 5.0;

b. reacting the antimony trichloride with a base present in an amount sufficient to maintain the solution at a pH from about 7 to about 10 and in the presence of said antimony complexing agent at a solution temperature from the freezing point of the solution to about 100° C to form cubic antimonous oxide as senarmontite;

c. separating the cubic antimonous oxide from the hydrolysis reaction zone.

10. The process of claim 9 in which the base is present when the antimony trichloride is added to the hydrolysis reaction zone.

11. The process of claim 9 in which the base is ammonium hydroxide.

12. The process of claim 10 in which the base is ammonium hydroxide.

13. The process of claim 9 in which the antimony trichloride is added to the hydrolysis reaction zone as an aqueous solution of antimony trichloride and water.

14. The process of claim 9 in which the antimony trichloride is added to the hydrolysis reaction zone as an aqueous chloride solution of antimony trichloride, water and a chloride selected from the group consisting of hydrochloric acid, alkali metal chlorides, alkaline earth metal chlorides, ammonium chloride and mixtures thereof.

15. The process of claim 9 in which the mole ratio of antimony trichloride to antimony complexing agent is from about 4.2 to 5.0.

16. The process of claim 9 in which the mole ratio of antimony trichloride to antimony complexing agent is from about 4.2 to about 4.6.

17. A process for the production of the senarmontite from antimony trichloride which comprises:

a. adding antimony trichloride to a hydrolysis reaction zone containing an aqueous solution of at least one organic antimony complexing agent selected from the group consisting of ethylenediaminetetraacetic acid, nitrilotriacetic acid, tartaric acid, mannitol and pyrocatechol, the mole ratio of antimony trichloride to total antimony complexing agent dissolved in solution being less than about five;

b. reacting the antimony trichloride in the presence of said antimony complexing agent and a base to hydrolyze the antimony trichloride to cubic antimonous oxide as senarmontite at an an aqueous solution to about 100° C and at a pH from about 7 to about 10;

c. separating the cubic antimonous oxide from the hydrolysis reaction zone.

18. The process of claim 17 in which the base is present in the aqueous solution prior to the addition of the antimony trichloride to the hydrolysis reaction zone.

19. The process of claim 17 in which the base is ammonium hydroxide.

20. The process of claim 18 in which the base is ammonium hydroxide.

21. The process of claim 17 in which the antimony trichloride is added to the hydrolysis reaction zone as an aqueous solution of antimony trichloride and water.

22. The process of claim 17 in which the antimony trichloride is added to the hydrolysis reaction zone as an aqueous chloride solution of antimony trichloride, water and a chloride selected from the group consisting of hydrochloric acid, alkali metal chlorides, alkaline earth metal chlorides, ammonium chloride and mixtures thereof.

23. The process of claim 18 in which the antimony trichloride concentration in the hydrolysis reaction zone is from about 1.5 to about 2.0 percent by weight.

24. The process of claim 23 in which the mole ratio of antimony trichloride to antimony complexing agent is from about 4.2 to 5.0.

25. The process of claim 23 in which the mole ratio of antimony trichloride to antimony complexing agent is from about 4.2 to about 4.6.

26. The process of claim 24 in which the base is ammonium hydroxide.

27. A process for the production of senarmontite from antimony trichloride which comprises:

a. adding antimony trichloride to a hydrolysis reaction zone containing a solution of water at least one organic antimony complexing agent selected from the group consisting of ethylenediaminetetraacetic acid, nitrilotracetic acid, tartaric acid, mannitol and pyrocatechol, and present in the solution in an amount of from about 1.5 to about 2.0 percent by weight, the mole ratio of antimony trichloride to total antimony complexing agent dissolved in solution being less than 5.0;

b. reacting the antimony trichloride with a base present in an amount sufficient to maintain the solution at a pH from about 7 to about 10 and in the presence of said antimony complexing agent at a solution temperature from the freezing point of the solution to about 100° C to form cubic antimonous oxide as senarmontite;

c. separating the cubic antimonous oxide from the hydrolysis reaction zone.

28. The process of claim 27 in which the base is present when the antimony trichloride is added to the hydrolysis reaction zone.

29. The process of claim 27 in which the base is ammonium hydroxide.

30. The process of claim 28 in which the base is ammonium hydroxide.

31. The process of claim 27 in which the antimony trichloride is added to the hydrolysis reaction zone as an aqueous solution of antimony trichloride and water.

32. The process of claim 27 in which the antimony trichloride is added to the hydrolysis reaction zone as an aqueous chloride solution of antimony trichloride, water and a chloride selected from the group consisting of hydrochloric acid, alkali metal chloride, alkaline earth metal chlorides, ammonium chloride and mixtures thereof.

33. The process of claim 27 in which the mole ratio of antimony trichloride to antimony complexing agent is from about 4.2 to 5.0.

34. The process of claim 27 in which the mole ratio of antimony trichloride to antimony complexing agent is from about 4.2 to about 4.6.

* * * * *

UNITED STATES PATENT AND TRADEMARK OFFICE
CERTIFICATE OF CORRECTION

PATENT NO. : 3,998,940
DATED : December 21, 1976
INVENTOR(S) : John L. Shafer

It is certified that error appears in the above-identified patent and that said Letters Patent are hereby corrected as shown below:

Column 5, line 16, "[(HOOC-CH$_2$)$_2$N-C$_2$-COOH)$_2$]" should read --[(HOOC-CH$_2$)$_2$N-C$_2$H$_4$-N(CH$_2$-COOH)$_2$]--.

Signed and Sealed this

Fifth Day of April 1977

[SEAL]

*Attest:*

RUTH C. MASON
*Attesting Officer*

C. MARSHALL DANN
*Commissioner of Patents and Trademarks*